United States Patent [19]

Kjøhl et al.

[11] Patent Number: 4,713,108

[45] Date of Patent: Dec. 15, 1987

[54] NPK COMPLEX FERTILIZER

[75] Inventors: Olav Kjøhl, Heistad; Torstein Obrestad, Ulefoss; Hans Groland, Porsgrunn, all of Norway

[73] Assignee: Norsk Hydro, a.s., Oslo, Norway

[21] Appl. No.: 774,716

[22] Filed: Sep. 11, 1985

[30] Foreign Application Priority Data

Sep. 12, 1984 [NO] Norway ................................ 843606

[51] Int. Cl.$^4$ ................................................ C05D 1/02
[52] U.S. Cl. ........................................ 71/32; 71/60; 71/62; 71/63
[58] Field of Search ................... 71/31, 32, 53, 60, 63, 71/64.06

[56] References Cited

U.S. PATENT DOCUMENTS 3,291,594 12/1966 Nickerson ............................ 71/47 X
3,926,609 12/1975 Effmet et al. ............................ 71/31

FOREIGN PATENT DOCUMENTS 0190288 10/1984 Japan ...................................... 71/32

OTHER PUBLICATIONS

CA69 (20):788532, Granular Potassium Chloride, 1967, Perlmutter et al.

*Primary Examiner*—Ferris H. Lander
*Attorney, Agent, or Firm*—Wenderoth, Lind & Ponack

[57] ABSTRACT

The present invention relates to NPK-fertilizer manufactured during application of KCl and/or $K_2SO_4$ as potassium source and which also contains magnesium in an amount of 0.2–3.0% calculated as MgO and added in the product as MgO, and method for manufacture of this product. The special features of the method is that to an evaporated nitrogen, phosphorous solution 0.2–3.0% reactive MgO and potassium salts are added before prilling or before/during granulation. MgO is preferably added as lightly calcined MgO having an average particle size of 0.2–3.0 mm, and is added in the mixer just before the prilling means. The new product has reduced tendency to swelling and caking.

3 Claims, No Drawings

NPK COMPLEX FERTILIZER

The present invention relates to a method for manufacture of chloride- and/or sulphate-containing NPK-fertilizer (complex fertilizer) having reduced tendency for swelling and caking. The fertilizer is manufactured by acidulation of phosphate with a mineral acid and subsequent removal of calcium salt, evaporation and prilling or granulation.

During storage, especially bulk storage, caking and/or swelling of the fertilizer particles have been experienced for certain NPK-fertilizers. The problem seems partly to depend on the type of potassium source applied, i.e. KCl or $K_2SO_4$.

In newly produced fertilizer the particles are free-flowing, but slow after-reactions will take place and some of these evidently lead to increasing volume and caking of the particles. If one is able to keep operating conditions giving a low content of water (<0.35%) during the production, it seems that the above mentioned problem can be avoided. However, in practice such strict conditions will lead to a very sensitive process, and it has often been found that this results in problems related to obtaining acceptable storage properties of the product even when one thought that these strict operating conditions had been observed.

The question is then whether the high content of water as such creates the storage problems or whether it is the presence of loosely bound (mobile) water which makes some unfortunate after-reactions possible.

It is previously known from Japanese patent application No. 2.000.652 to stabilize NPK-fertilizers against moisture and temperature variations by adding magnesium hydroxide in amounts of 0.5-1.0 weight % calculated as MgO. However, such addition comprises incorporation of water and will not solve the problem one was facing.

As known methods which could solve the problem could not be found, the inventors considered further investigations necessary to determine the real cause of the storage problems. It was then close at hand to start with the theory of after-reactions. A possible variable here is the type of potassium salt used, and one started by studying possible after-reactions for KCl and $K_2SO_4$ respectively, for later on to see whether one could prevent or strongly delay possible undesired after-reactions.

According to experience, only certain NPK-formulations cause problems, and therefore one studied some of those which had been found to contain particles that increased their volume during storage (change of volume of several percents). This resulted in crumbling of the particles and caking problems. One of these NPK-formulations was manufactured from a water solution having roughly the following composition by weight %:
38.9%: $NH_4NO_3$
12.1%: $NH_4H_2PO_4 + (NH_4)_2HPO_4$
25.8%: $K_2SO_4$
15.2%: $MgSO_4 \cdot H_2O$
0.5%: $H_2O$ The mixture comprises a complicated chemical system, and the same components will most likely not be found in corresponding amounts in the finished product. The system can not be considered as a mechanical mixture of salts as moisture is present and because large temperature differences are involved.

$NH_4NO_3$ (AN), which is the most important main component, can pass through several phases during solidification and further cooling down to room temperature. Each transformation will for one thing result in volume changes. For instance will the transformation from AN III to AN IV increase the volume with about 3.6%.

The chemical reaction which seems to be a core reaction in the swelling mechanism is, however, a salt pair transition which can be read as follows:

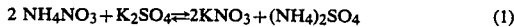

$$2\ NH_4NO_3 + K_2SO_4 \rightleftharpoons 2KNO_3 + (NH_4)_2SO_4 \qquad (1)$$

During studies of the swelling phenomena it was shown by chemical analyses and X-ray diffractometry that this salt pair conversion took place in sulphate-based fertilizer. The conversion already started in the mixer and continued during bulk storage. The reaction velocity proved to be strongly dependent of firstly the water content and secondly the temperature, but also the chemical composition at large.

When the reaction is according to equation (1), the salt pair conversion will result in serious swelling or expansion. If AN is present in form III, the expansion is 5.3% while it will be 7.7% if AN is in form IV. Transformation from form III to IV will, as known, take place at 32° C. when moisture is present.

The volume increase resulting from the salt pair conversion can not alone explain the swelling phenomena. However, investigations showed that both $KNO_3$ and $(NH_4)_2SO_4$ will react further and form new compounds.

In order to determine whether the salt pair conversion:

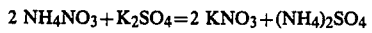

$$2\ NH_4NO_3 + K_2SO_4 = 2\ KNO_3 + (NH_4)_2SO_4$$

was the main factor of the swelling mechanism, it was necessary to determine how much $NH_4NO_3$ or $K_2SO_4$ was converted in samples having different degrees of swelling. The degree of conversion was determined by selective extraction of one of the components. Unreacted $NH_4NO_3$ was determined for a large number of samples having different degrees of swelling. It was found that the swelling increased as the amount of unreacted $NH_4NO_3$ increased, i.e. when the degree of conversion of $NH_4NO_3$ increased.

A good correlation was found between the percent swelling degree and the amount of unreacted $NH_4NO_3$, which confirmed that the salt pair conversion is the main reaction of the swelling mechanism.

The degree of swelling (S) can be defined as:

$$S = 100 \cdot k \cdot \frac{(L_1 - L_2)}{L_1},$$

where
$L_1$ is the liter weight before the swelling test
$L_2$ is the liter weight after the swelling test
k is a constant depending on type of fertilizer When KCl is used as potassium source, the conversion can in a simplified form be written as follows:

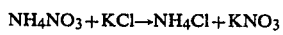

$$NH_4NO_3 + KCl \rightarrow NH_4Cl + KNO_3$$

KCl shall not exist freely at equilibrium. The amount of NH$_4$NH$_3$ which can be converted can easily be calculated when the amount of KCl added is known.

The conversion was found to take place at higher velocity when the content of mobile water was high. How far this reaction has gone to the right was investigated by selective extraction of NH$_4$NO$_3$ from the finished product.

Series of samples were investigated to determine how large part of the NH$_4$NO$_3$ present reacted with KCl to NH$_4$Cl and KNO$_3$. The caking tendency for the same samples was also measured and was found to increase by increasing part of NH$_4$NO$_3$ converted. As the reaction, as stated above, is a function of mobile water present, one assumed that said conversion could be prevented or at least delayed by in some way reducing the amount of mobile water.

Accordingly, it seemed that in certain fertilizer formulations having some free water present, after-reactions occurred both when KCl and K$_2$SO$_4$ were used as potassium source and that these after-reactions gave the product undesired properties.

As it previously was found to be difficult to obtain products having a sufficiently low content of water by ordinary regulation of the operating conditions, one started to investigate the possibilites for binding the mobile water in the finished NPK fertilizer.

The object of the present invention was to arrive at a NPK-fertilizer containing KCl and/or K$_2$SO$_4$ and were stable during storage, especially bulk storage, such that no swelling and/or caking of the fertilizer particles occurred.

A further object was to arrive at a simple and rational way of manufacturing such products.

Several additives which are known to bind water are known, for instance in connection with NH$_4$NO$_3$, where it for several reasons is of interest to use water-binding additives. However, it is not obvious that such additives will be suitable for solving the above problem with NPK-fertilizers. The inventors had therefore to investigate whether other additives could be suitable for the present purpose. During the selection of additives one also had to take into account which reactions could possibly occur between the additives and the salts in the fertilizer. Further, the additives had to be acceptable agronomically such that they would not diminish the agronomic qualities of the product.

In view of the above mentioned requirements, one first started to investigate the effect of some additives on NPK-fertilizers containing K$_2$SO$_4$ as potassium source.

In this test series unhydrous Na$_2$SO$_4$ was tried out. This salt can bind up to 10 mol H$_2$O as crystal water, i.e. 1.26 g H$_2$O per gram Na$_2$SO$_4$, and should accordingly give good effect provided that it did not react and thereby form compounds which did not have water-binding properties. Closer investigation of Na$_2$SO$_4$ showed that it had low water-binding effect in this salt system.

Al(OH)$_3$, which is a known water-binding additive, was added in an amount of 0.1 g Al per 100 g of a synthetic NPK-solution. However, it was found that this additive did not give any significant effect.

Magnesium, in the form of kieserite, is a desired component in several NPK-fertilizers. It was therefore investigated whether MgO had the ability to bind the remaining moisture and therefore could be used instead of kieserite. Some tests were run with the addition of 1% lightly calcined, finely ground MgO to a synthetic nitrogen/phosphorous solution (NP-solution) together with K$_2$SO$_4$. Particles made from this solution were stored for some time and tested with respect to volume increase (swelling). It was then found that addition of MgO had a very good effect. This possibly happened because MgO reacts with the NP-solution under formation of Mg(NO$_3$)$_2$ and magnesium phosphates (possibly MgHPO$_4$). These salts have the ability to bind several mol water as crystal water per mol salt. The effect was detected by direct measurement of the equilibrium pressure over the product. The measurements indicated that the water vapour pressure was halved when 1.6% MgO was added. The water-binding effect was also observed as a decrease in the NH$_4$NO$_3$ conversion when MgO was added. It was surprisingly observed that in spite of the lower water vapour pressure a lower water-retaining velocity was attained when the samples contained 1.6% MgO.

Several different reactions can take place when MgO is added to a NP-solution together with KCl/K$_2$SO$_4$.

The following can be formed:

(a) phosphates

1. NH$_4$H$_2$PO$_4$+MgO→MgNH$_4$PO$_4$+H$_2$O
2. NH$_4$H$_2$PO$_4$+MgO→MgHPO$_4$+H$_2$O+NH$_3$
3. 2 NH$_4$H$_2$PO$_4$+3 MgO→Mg$_3$(PO$_4$)$_2$+2 NH$_3$+3 H$_2$O (b) nitrate 4. 2 NH$_4$NO$_3$+MgO→Mg(NO$_3$)$_2$+2 NH$_3$+H$_2$O (c) chloride 5. 2 NH$_4$Cl+MgO→MgCl$_2$+H$_2$O+2 NH$_3$ All these magnesium compounds bind H$_2$O as crystal water.

The results of the above mentioned preliminary investigations were most positive, and the inventors found it correct to further investigate the effect of additional MgO to fertilizers which according to experience could give storage problems. It was also investigated how and where in the process the MgO should be added. These investigations showed that one could obtain storage- and swelling-stable NPK-fertilizers both when KCl and K$_2$SO$_4$ were used as potassium source provided that sufficient amounts of MgO were added during the manufacture. Already at an addition of 0.2% by weight MgO a positive effect was attained. 1-2 weight % was found to be the most suitable amount, but up to 3 weight % MgO can be used. One also arrived at en suitable process for manufacturing such products.

The special features of the invention are as defined in the claims.

The invention will now be further explained in the following examples:

EXAMPLE 1

This example shows the results of a full scale experiment for manufacture of NPK 14-4-17, where K$_2$SO$_4$ is used as potassium source. This fertilizer should also contain 1% Mg, and this was added as kieserite (MgSO$_4$). The experiment was first run without MgO-addition in order to get some reference samples, then 0.6% MgO was added and thereupon 1% MgO. The amount of kieserite was reduced, (on Mg-basis), corresponding to the amount of MgO added. The MgO used had a bulk weight of about 0.6 kg/l having a particle size distribution of 2-6 mm=0-30%, 0.5-2 mm=40-70% and less than 0.5 mm=°-40%. The MgO was added together with K$_2$SO$_4$ and kieserite before they were supplied to the mixer and mixed with concentrated NP-solution. Samples for the swelling test and chemical analysis were taken during the experiment. The result of the experiments are shown in Table I.

TABLE I

| Sample | MgO-content weight % | Degree of swelling after 2 days at 60° C. | % NH$_4$NO$_3$ converted after 2 days at 60° C. |
|---|---|---|---|
| 1 | 0 | 100,0 | 65,2 |
| 2 | 0,6 | 43,6 | 51,8 |
| 3 | 1,0 | 39,4 | 45,8 |
| 4 | 0 | 101,0 | 64,7 |

Samples 1 and 4 did not contain MgO, samples 2 and 3 contained 0.6% and 1% MgO respectively.

The results of the swelling tests at 60° C. and the degree of conversion for NH$_4$NO$_3$ is given in Table I, from which it is seen that MgO gave the desired effect. The results after 2 days at 60° C. show that the samples without MgO had a volume increase twice as large as those with MgO.

EXAMPLE 2

This example shows the results of a full scale experiment for manufacture of NPK 25-3-6, where KCl was used as potassium source. The experiments were first run without any MgO-addition and thereupon 1.6% MgO was added directly into the mixer for the NP-solution, KCl and MgO, whereupon the mixture was prilled. The pH of the product was measured and also its water vapour pressure "$P_{H2O}$" just after formation of the prills and after 25 days of storage in bulk. The results are given in Table II.

TABLE II

| Sample | % MgO | "$P_{H2O}$" (mb), 24° C. |
|---|---|---|
| 1 | 0 | 10,1 |
| 2 | 0 | 8,9 |
| 3 | 0 | 8,2 |
| 4 | 1,6 | 4,7 |
| 5 | 1,6 | 5,3 |
| 6 | 1,6 | 4,9 |

Table II shows clearly that MgO gives a very strong water-binding effect and accordingly lowers the water vapour pressure "$P_{H2O}$".

For fertilizers with and without MgO and stored for 25 days the "$P_{H2O}$" was 4.7 mb and 9.8 mb respectively.

"$P_{H2O}$" is an expression for water bound in the fertilizer. Generally speaking, it is assumed that the water absorption velocity of the fertilizer and thereby its caking tendency is largest for fertilizers having a low "$P_{H2O}$". However, it was surprisingly found that fertilizer having 1.6% MgO and a low value for "$P_{H2O}$" was less hygroscopic than fertilizers without MgO. A possible explanation can be that MgO and H$_2$O form a film or coating on the particles and thereby reduce the water absorption.

The caking test was also carried out at 65% relative humidity and at 25° C. The results are shown in Table III. The caking tendency for fertilizers with and without MgO was also investigated after 3 weeks of storage in bulk., This investigation showed that fertilizers containing 1.6 MgO were free-flowing without crust formation, while those without MgO settled and tended to form crusts.

TABLE III

| Sample | MgO | % H$_2$O | Caking number after 20 hours' storage |
|---|---|---|---|
| 1 | 0 | 0,36 | 170 |
| 2 | 0 | 0,30 | 90 |
| 3 | 0 | 0,33 | 330 |
| 4 | 1,6 | 0,47 | 0 (completely free-flowing) |
| 5 | 1,6 | 0,48 | 126 |
| 6 | 1,6 | 0,47 | 80 |

The caking numbers (K) is an expression for the fertilizer's caking tendency. Low values for the caking numbers show that the fertilizer had a low caking tendency. When K=0, the fertilizer is completely free-flowing, K<150 is considered acceptable, while K>300 might cause problems during bulk storage.

From the examples it can be seen that the problems one had with certain NPK-types of fertilizers were solved by addition of MgO and this was also the case when KCl and K$_2$SO$_4$ was used as potassium source. The necessary amount of MgO will vary somewhat according to the type of NPK-fertilizer in question, but, further investigations showed that an addition of 0.2-3.0% MgO was sufficient. When every condition was taken into account, it was found that addition of 1-2% MgO gave the best results. Further, finely ground MgO and of a lightly calcined type should preferably be used.

It is not very critical where the MgO is added in the process, but it has to take place after acidulation of the rock phosphate with mineral acid. It was found that the MgO should preferably be added just before prilling or granulation, preferably in the mixer where the NP-solution and the additive salts were mixed.

We claim:

1. A complex NPK-fertilizer manufactured by using KCl and/or K$_2$SO$_4$ as a potassium source, characterized in that it contains magnesium in an amount of 0.2-3.0% calculated MgO and added to the product as lightly calcined MgO having an average particle size of 0.2-3.0 mm.

2. A method for the manufacture of a chloride and/or sulphate-containing complex NPK-fertilizer according to claim 1 and having a reduced tendency for swelling and caking, and where the fertilizer is manufactured by acidulation of a phosphate with a mineral acid and subsequent removal of any calcium salt present, followed by evaporation and prilling or granulation, characterized in that 0.2-3.0% of reactive MgO and potassium salts are added to the evaporated solution before prilling or before/during granulation said MgO being added in that form of lightly calcined MgO having an average particle size of 0.2-3.0 mm.

3. A method according to claim 2, characterized in that the MgO is added to the mixture just ahead of the prilling means

* * * * *